United States Patent
Lepird et al.

(10) Patent No.: US 12,371,010 B2
(45) Date of Patent: Jul. 29, 2025

(54) INTEGRATED TRAJECTORY FORECASTING, ERROR ESTIMATION, AND VEHICLE HANDLING WHEN DETECTING AN OBSERVED SCENARIO

(71) Applicant: FORD GLOBAL TECHNOLOGIES, LLC, Dearborn, MI (US)

(72) Inventors: John Lepird, Pittsburgh, PA (US); Pragati Satpute, Canton, MI (US); Ramadev Burigsay Hukkeri, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 675 days.

(21) Appl. No.: 17/563,886

(22) Filed: Dec. 28, 2021

(65) Prior Publication Data
US 2023/0202470 A1 Jun. 29, 2023

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 40/04* (2013.01);
(Continued)

(58) Field of Classification Search
None
See application file for complete search history.

(56) References Cited

U.S. PATENT DOCUMENTS

| 1,034,337 A | 7/1912 | Barrow |
|---|---|---|
| 9,514,378 B2 | 12/2016 | Armstrong-Crews et al. |

(Continued)

FOREIGN PATENT DOCUMENTS

| CN | 111709665 A | 9/2020 |
|---|---|---|
| EP | 3349146 A1 | 7/2018 |

(Continued)

OTHER PUBLICATIONS

Kuhn et al., Christopher B., "Trajectory-Based Failure Prediction for Autonomous Driving," Conference Paper, Jul. 2021, 8 pages.

(Continued)

*Primary Examiner* — Aniss Chad
*Assistant Examiner* — Madison R. Inserra
(74) *Attorney, Agent, or Firm* — Frank A. MacKenzie; Brooks Kushman, P.C.

(57) ABSTRACT

Disclosed herein are system, method, and computer program product aspects for enabling an autonomous vehicle (AV) to react to objects posing a risk to the AV. The system can monitor an object within a vicinity of the AV. A plurality of trajectories predicting paths the object will take can be generated, the plurality of trajectories being based on a plurality of inputs indicating current and past characteristics of the object. Using a learned model, a forecasted position of the object at an instance in time can be generated. An error value representing how accurate the forecasted position is versus an observed position of the object can be stored. Error values can be accumulated over a period of time. A risk factor can be assigned for the object based on the accumulated error values. A maneuver for the AV can be performed based on the risk factor.

17 Claims, 7 Drawing Sheets

(51) Int. Cl.
  *B60W 40/04* (2006.01)
  *B60W 50/00* (2006.01)
  *B60W 60/00* (2020.01)
  *G06N 3/02* (2006.01)
  *G06N 3/0442* (2023.01)
  *G06N 3/045* (2023.01)
  *G06N 3/09* (2023.01)
  *G06N 5/01* (2023.01)
  *G06N 20/00* (2019.01)

(52) U.S. Cl.
  CPC .... *B60W 50/0097* (2013.01); *B60W 60/0011* (2020.02); *B60W 60/00274* (2020.02); *G06N 3/02* (2013.01); *B60W 2554/4041* (2020.02); *B60W 2556/10* (2020.02)

(56) References Cited

U.S. PATENT DOCUMENTS

| | | | |
|---|---|---|---|
| 10,054,678 | B2 | 8/2018 | Mei et al. |
| 10,220,766 | B2 | 3/2019 | Soehner et al. |
| 10,416,679 | B2 | 9/2019 | Lipson et al. |
| 10,445,599 | B1 | 10/2019 | Hicks |
| 10,488,863 | B2 | 11/2019 | She et al. |
| 10,621,448 | B2 | 4/2020 | Schubert et al. |
| 11,022,971 | B2 | 6/2021 | Della Penna |
| 11,810,365 | B1 * | 11/2023 | Crego .................... G06V 20/58 |
| 2017/0248693 | A1 | 8/2017 | Kim |
| 2018/0157269 | A1 | 7/2018 | Prasad et al. |
| 2018/0284779 | A1 | 10/2018 | Nix |
| 2018/0299534 | A1 | 10/2018 | LaChapelle et al. |
| 2019/0129009 | A1 | 5/2019 | Eichenholz et al. |
| 2020/0004259 | A1 * | 1/2020 | Gulino ................ G05D 1/0221 |
| 2020/0159244 | A1 | 5/2020 | Chen et al. |
| 2020/0331465 | A1 | 10/2020 | Herman et al. |
| 2021/0339741 | A1 * | 11/2021 | Rezvan Behbahani ...................... B60W 40/04 |
| 2022/0203974 | A1 * | 6/2022 | Lee .................... B60W 30/0956 |
| 2023/0140079 | A1 * | 5/2023 | Zhu .......................... G06T 7/60 382/103 |
| 2023/0280457 | A1 * | 9/2023 | Wang .................... G01S 13/723 342/71 |

FOREIGN PATENT DOCUMENTS

| | | |
|---|---|---|
| EP | 3396408 A1 | 10/2018 |
| JP | 2007310457 A | 11/2007 |
| WO | WO 2010/027795 A1 | 3/2020 |
| WO | 2020205648 A1 | 10/2020 |

OTHER PUBLICATIONS

Lee et al., "GPS/DR Error Estimation for Autonomous Vehicle Localization," Sensors 2015, 15, 20779-20798; doi:10.3390/s150820779, 20 pages.

Wang et al., Fast Risk Assessment for autonomous Vehicles Using Learned Models of Agent Futures, arXiv:2005.13458v2 [cs.RO] Jun. 3, 2020, 9 pages.

Zakaria et al., "A Path Tracking algorithm Using Future Prediction Control With Spike Detection for an Autonomous Vehicle Robot," INTECH, Int'l Journal of Advanced Robotic Systems, 2013, vol. 10, 309:2013, 9 pages.

Search Report for PCT Application No. PCT/US2022/082346, Dated May 9, 2023, 3 pages.

* cited by examiner

INTEGRATED TRAJECTORY FORECASTING, ERROR ESTIMATION, AND VEHICLE HANDLING WHEN DETECTING AN OBSERVED SCENARIO

BACKGROUND

When operating a vehicle (e.g., a car, boat, drone, truck, etc.), situations arise when split-second decisions must be made to react to certain road conditions. The conditions can include scenarios where objects in the vehicle's path can pose a risk to the vehicle. For example, scenarios can occur when other vehicles along the vehicle's path operate erratically (e.g., a car performing donuts at an intersection, a car performing a K-turn, a car swerving from lane to lane, etc.).

Conventionally, such scenarios are dealt with based on the vehicle operator's subjective judgment. For example, the vehicle operator can judge what actions to take given the nature of the scenario. The operator can use his or her own judgment to slow the vehicle down, speed the vehicle up, embark on another trajectory, give more lateral distance to the other vehicle, or give more longitudinal distance to the other vehicle. However, in the context of a self-driving autonomous vehicle (AV) where no such operator exists, solutions must be found to have the AV deal with these scenarios. Thus, systems and methods are needed to address the aforementioned problem.

SUMMARY

Aspects of this disclosure are directed to a system and methods that enable AVs to deal with certain road conditions that may pose a risk to the AV. In aspects, the system can implement methods to enable the AV to deal with these conditions by monitoring an object within a vicinity of the AV. A plurality of trajectories predicting paths the object will take at a future time can be generated, the plurality of trajectories being based on a plurality of inputs indicating current and past characteristics of the object. Using a learned model, a forecasted position of the object at an instance in time can be generated based on the plurality of trajectories. An error value representing how accurate the forecasted position is versus an observed position of the object can be stored, the error value being based on the learned model and one or more heuristic rules. Error values can be accumulated over a period of time. A risk factor can be assigned for the object based on the accumulated error values. A maneuver for the AV can be performed based on the risk factor.

In aspects, the maneuver can include: moving the AV a longitudinal distance from the object, moving the AV a lateral distance from the object, or slowing down the AV. The system can also penalize proposed maneuvers or trajectories that encroach on the object, favoring behavioral changes in the AV that avoid close interaction with objects that have high error values computed for their forecasted positions. In aspects, the system can determine the error value based on determining a Euclidean distance between the forecasted position and the observed position of the object. In aspects, the system can also determine the error value based on a heading, velocity, and acceleration errors. In aspects, the learned model architecture may include a deep neural network, such as an LSTM model in combination with a Recurrent Neural Network (RNN) with feedforward regression layers. In aspects, the model architecture can be varied to include only RNN or RNN in combination with machine learning models other than LSTM models. In aspects, the system can determine an estimated value based on the accumulated error values and determine the risk factor based on the average value.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Provided herein are system, apparatus, device, method and/or computer program product aspects, and/or combinations and sub-combinations thereof, for enabling AVs to deal with certain road conditions that may pose a risk to the AV. Specifically, the system can allow an AV to react to objects that potentially pose a risk to the AV. The system is unique from conventional system in that, rather than forecast positions of objects that may pose a risk to the AV and wait to see if its predictions are validated, the system forecasts positions of objects and computes error values indicating whether the forecasted positions are likely to be reliable. This may be done in real-time. This identification of errors in prediction forecasts on-the-fly enables motion planning to treat error-prone forecasts with more caution and enables an AV to use this information to adjust and improve predicted trajectories to avoid and/or react to objects. The error values can indicate to the AV at what level of confidence its prediction forecasts for the object are reliable and based on the same they can allow the AV to react to the object.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an AV. However, the present solution is not limited to AV applications. The present solution may be used in other applications such as robotic applications, radar system applications, metric applications, and/or system performance applications.

Figure 1:
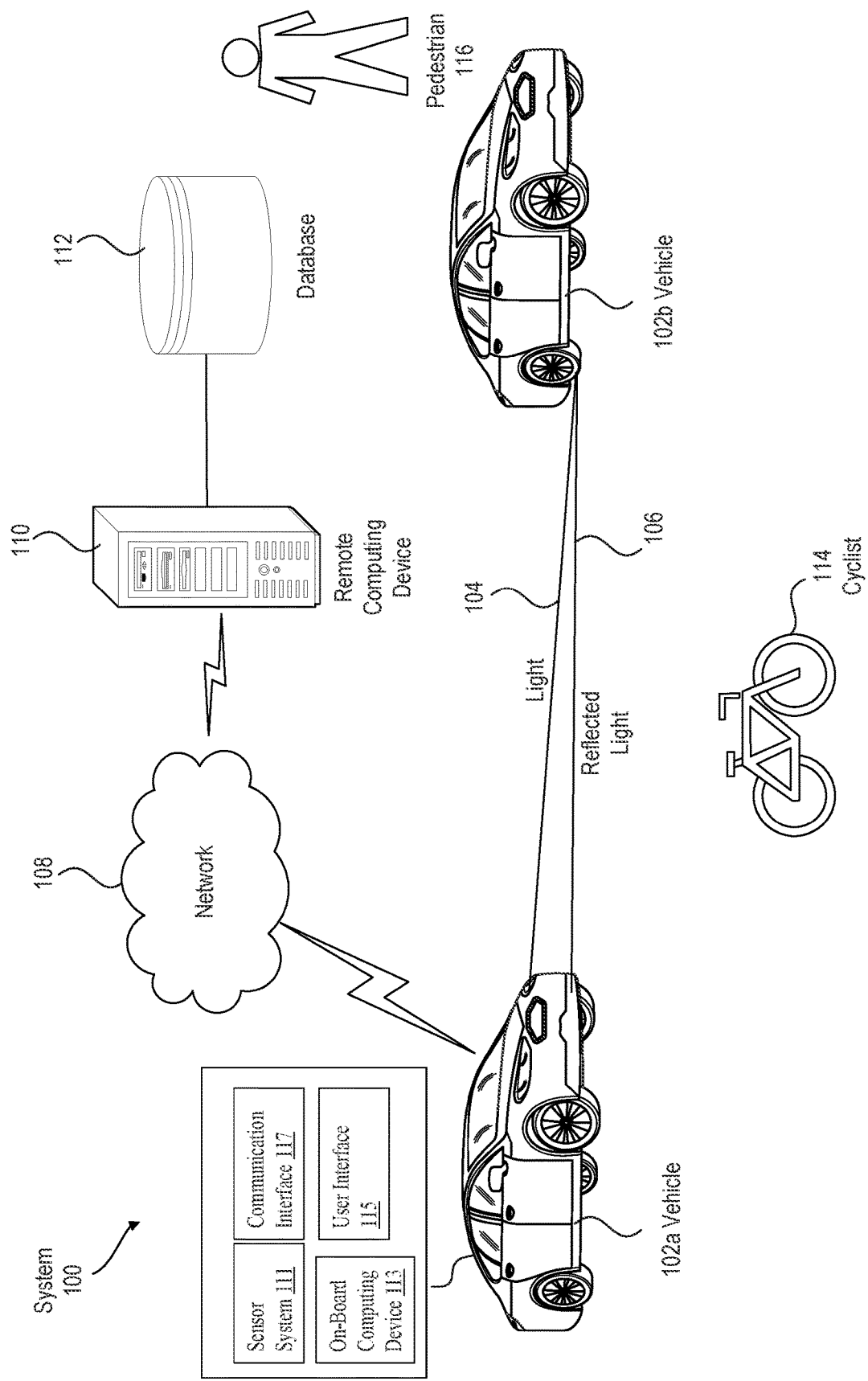
FIG. 1 illustrates an exemplary AV system, in accordance with aspects of the disclosure.

FIG. 1 illustrates an exemplary AV system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, or 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
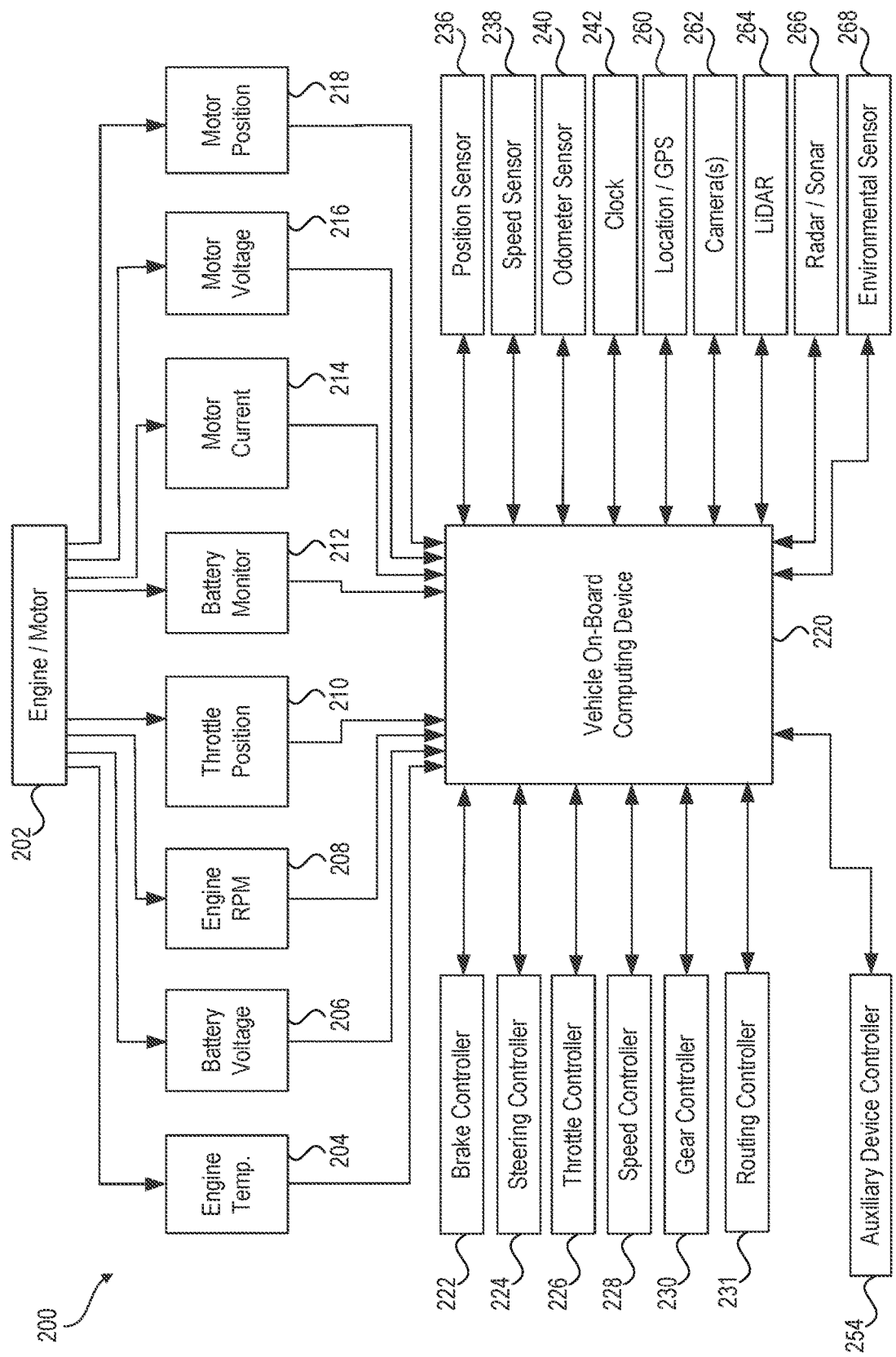
FIG. 2 illustrates an exemplary architecture for an AV, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some aspects, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., a cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi®, an infrared link, Bluetooth®, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a and 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of AV 102*a* or 102*b* of FIG. 1, in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 7. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the AV 102*a* or 102*b*. Any known or to be known technique for making an object detection based on sensor data and/or captured images may be used in the aspects disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the AV 102*a* or 102*b*. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an AV 102*a*. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102*a*. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., lidar or RADAR data, camera images, etc.) in order to identify objects and/or features in the environment of AV 102*a*. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various aspects, the on-board computing device 220 may determine a motion plan for the AV 102a. For example, the on-board computing device 220 may determine a motion plan for the AV 102a based on the perception data and/or the prediction data. Specifically, given predictions about the future locations of proximate objects and other perception data, the on-board computing device 220 can determine a motion plan for the AV 102a that best navigates the AV 102a relative to the objects at their future locations.

In some aspects, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the AV 102a, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision may be avoided if the AV 102a follows a defined vehicle trajectory and/or implements one or more dynamically generated emergency maneuvers performed in a pre-defined time period (e.g., N milliseconds). If the collision may be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the AV 102a is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Figure 3:
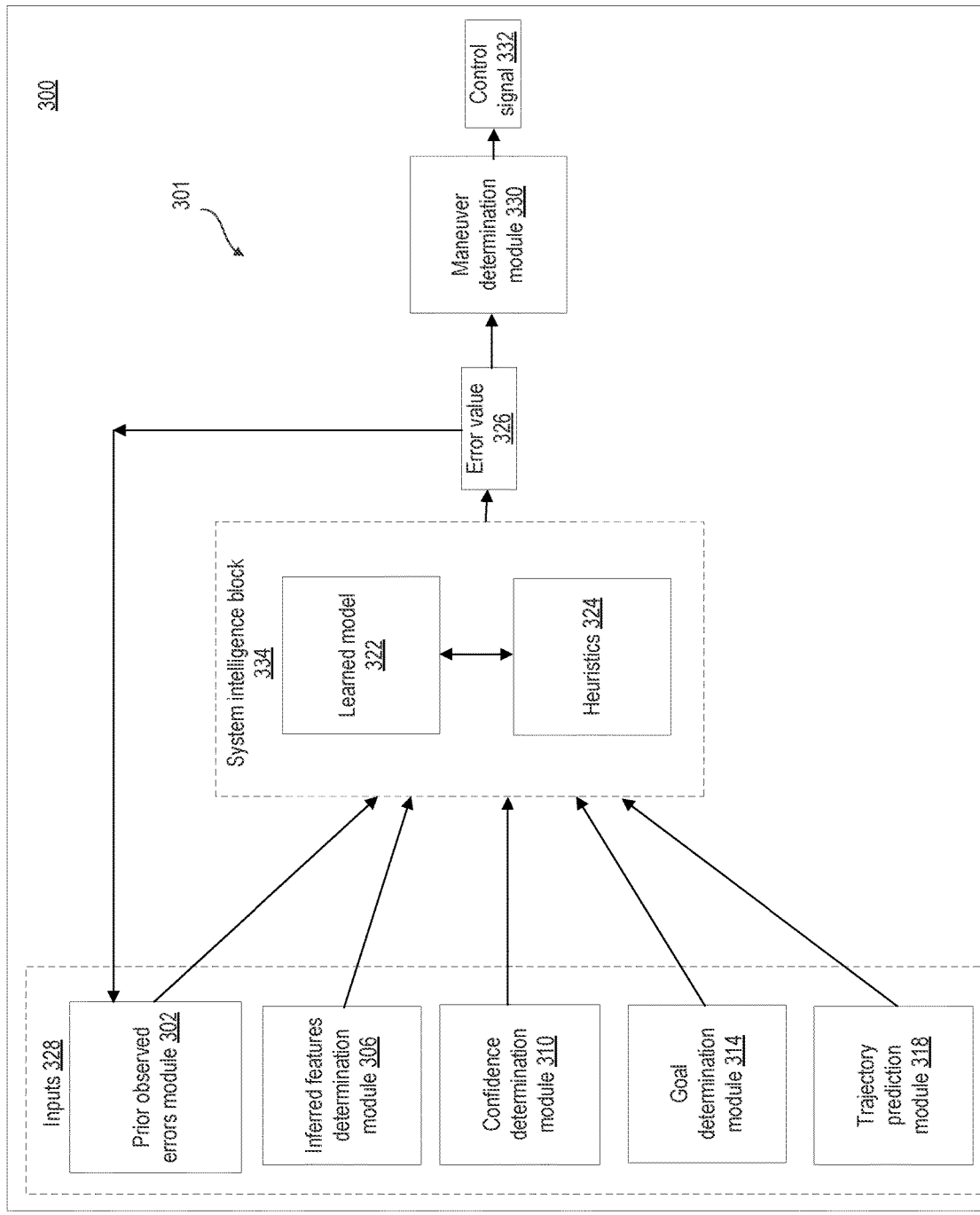
FIG. 3 is an example control flow of a system for enabling the AV to deal with certain road conditions that may pose a risk to the AV, in accordance with aspects of the disclosure.

FIG. 3 is an example control flow 301 of a system 300 for enabling the AV 102a to deal with certain road conditions that may pose a risk to the AV 102a, in accordance with aspects of the disclosure. System 300 may be implemented as part of the vehicle on-board computing device 220 of FIG. 2, and/or with modules that when executed by one or more processors of the on-board computing device 220 execute control flow 301.

In aspects, control flow 301 may begin by collecting and/or receiving one or more inputs 328 provided by the various controllers and/or sensors of the AV 102a, as described with respect to FIG. 2, or from various modules that can interface with the controllers and/or sensors of FIG. 2. The inputs 328 refer to data/information about the environment and/or objects in the vicinity of AV 102a, and can indicate current and past characteristics of the environment and/or objects within the environment of AV 102a. The inputs 328 can, for example, represent data/information related to monitored objects within a vicinity of the AV 102a (e.g., object features, etc.), represent data/information generated to identify what those monitored objects are, represent data/information indicating how those objects are moving, represent data/information generated that predicts a trajectory of those objects, represent data/information indicating a possible goal of the objects, represent data/information indicating past movements of the objects, etc. Such inputs are described with respect to U.S. application Ser. No. 17/102,303, filed on Nov. 23, 2020, the contents of which is incorporated by reference herein in its entirety.

The modules refer to one or more software programs that can implement one or more computer implemented models, that can interface with the controllers and/or sensors of the AV 102a. The interfacing may be done via application programming interfaces (APIs) or by interfacing with hardware components that couple to the controllers and/or sensors. In aspects, the modules can process the information provided by the controllers and/or sensors to either put the information in a form that may be further processed by the system 300, or can use the information obtained to generate data that may be processed by the system 300. By way of example, information obtained from the cameras 262 may be input into an inferred features determination module 306 to identify features of objects within the vicinity of the AV 102a. The features can include, for example, shapes of objects, colors of objects, speed of the objects, etc. In aspects, after identifying the inferred features, a prediction may be made as to what the object is (e.g., AV 102b, a cyclist 114, a pedestrian 116, etc.). In aspects, the inferred features and the prediction can then be passed to a confidence determination module 310 to determine with a confidence level what type of object the features represent (e.g., AV 102b, a cyclist 114, a pedestrian 116, etc.).

In aspects, the modules of the system 300 can include a prior observed errors module 302, the inferred features determination module 306, the confidence determination module 310, a goal determination module 314, a trajectory prediction module 318, and a maneuver determination module 330.

The prior observed errors module 302 refers to a module that can generate and/or provide inputs 328 related to prior error values calculated for observed objects. The prior error values are errors based on an observed position of the object and a predicted trajectory for that object. For example, if an object (such as another vehicle—AV 102b) is observed by the AV 102a, the system 300 can make determinations regarding the predicted trajectory and position of the object. Based on where the object actually ends up at some time in the future, an error determination may be calculated indicating how far off the calculations for the predicted trajectory was off by. In aspects, this may be represented as an error value 326. The error value 326 can have a displacement (i.e. magnitude) component and an angular component. In aspects, the displacement component of the error value 326 may be determined based on a Euclidean distance between the predicted trajectory (i.e., the forecasted position of the object) and the observed position of the object. The Euclidean distance can indicate by how much displacement the forecasted position differs from the observed position of the object. An angular component can also be computed for the error value 326 to see at what angle the forecasted position and the observed position were off by. In aspects, the error value 326 can be determined with respect to speed, acceleration, and heading of the object, in addition to or in lieu of the Euclidean distance. These error values can be accumulated and collected by the prior observed errors module 302 and fed back into the system 300 to make further error determinations based on. The purpose of having the system 300 utilize prior error calculations as an input is to be able to determine, based on past error calculations, how better to modify the calculations made by the system 300 to make future predictions. In this way, the prior error values can serve as feedback to assist in generating future predictions.

The inferred features determination module 306 refers to a module that can generate and/or provide inputs 328 related to what an object that is observed by the AV 102a is. For example, the inferred features determination module 306 can utilize inputs from cameras 262, lidar system 264, and/or a radar and/or a sonar system 266 to generate inputs 328 predicting that the object is a certain type of object (e.g., AV 102b, a pedestrian 116, a cyclist 114, a downed tree, a pothole, etc.). The inferred features determination module 306 can use shapes of the object, speed of the object, or physical characteristics or behaviors of the object to make the prediction. Using computer implemented rules based on observed pose, velocity, acceleration, and a high definition (HD) map, a prediction can be made about what the object is likely to be. For example, a velocity of the object, which may be determined based on observations of the movement of the object over time periods may be determined and aid in the prediction. For example, using lidar system 264, radar and/or a sonar system 266, and/or location sensors 260, the inferred features determination module 306 can perform computations based on, for example, deflected and/or reflected waves to determine Doppler effect and beat frequency between the waves to measure a vehicle speed. This speed can aid in the classification of the object as a certain type. For example, if the speed is within a certain range of values that a car would typically travel, the object may be classified as a car. Similarly, the object may be classified as a cyclist 114, a pedestrian 116, or any other type of object that the inferred features determination module 306 is trained to detect. Other features can also be determined by the inferred features determination module 306, such as shapes of objects, etc. In aspects, the inferred features determination module 306 can determine the inferred features via computer implemented rules or models, such as image processing algorithms that can work in conjunction with machine learning models, such as neural networks, classification models, etc., which may be trained to classify features and/or objects. The machine learning models can, based on historical data, use features such as interaxial distance, object area, velocity, length of track observation, acceleration, etc. to classify features and/or objects.

The confidence determination module 310 refers to a module that can generate and/or provide inputs 328 related to a confidence level that the object and/or features observed are a certain type of object. For example, in aspects, the confidence determination module 310 can implement computer implemented rules or models that can give a confidence level that the object predicted by the inferred features determination module 306 is actually that predicted object. The purpose of determining the confidence is to ensure with a level of certainty that the object is of a certain type. This level of certainty will aid in determining how the AV 102a will react to the object. If, for example, the system 300 is more confident that the object is AV 102b, a cyclist 114, or a pedestrian 116, the system 300 can more accurately determine a forecasted position for the object accordingly in the future and determine what maneuver to take with respect to that object. Depending on the type of object, the maneuvers may differ. In aspects, the confidence determination module 310 can be a standalone module or integrated as a part of the inferred features determination module 306.

The goal determination module 314 refers to a module that can generate and/or provide inputs 328 related to predictions of what the system 300 believes the goal of the observed object is. For example, the goal determination module 314 can generate values and/or inputs 328 indicating what it believes the goal of the object is, based on the object's observed movements, speed, orientation, etc. For example, if the object is slowing down at a certain rate, the goal determination module 314 can determine that the object's goal is likely to stop. If the object is performing maneuvers indicative of a K-turn (by, for example, stopping, moving backwards, then moving forward, etc. in a pattern indicative of a K-turn) the goal determination module 314 can determine that the object's goal is likely to be to perform a K-turn. In aspects, the goal determination module 314 can determine the predicted goals via computer implemented rules and models, for example machine learning models, such as neural networks, classification models, etc., that may be trained to classify patterns of movements. Based on matching the patterns observed with those the models are trained to recognize, the goal determination module 314 can predict goals of an object.

The trajectory prediction module 318 refers to a module that can generate and/or provide predicted trajectories of objects. The predicted trajectories can be used to generate a forecasted position of the observed object at an instance in time in the future. The predicted trajectories may be determined via computer-implemented models designed to determine a set of possible paths the object can take based on its current trajectory, speed, orientation, movements, object type, environment in which it is operating, etc. For example, if the object is determined to be another vehicle (e.g., AV 102b), and is observed approaching an intersection, the trajectory prediction module 318 can determine that the object has four possible trajectories. These can include: (1) moving straight ahead, (2) turning left, (3) turning right, or (4) making a U-turn. Depending on the precision by which the computer implemented models make predictions, the trajectories can further indicate what possible lanes the object can turn into, at what speed the vehicle will travel when it reaches a certain point on the possible trajectory, etc. A Person of Ordinary Skill in the Art (POSA) will be familiar with trajectory prediction algorithms, and therefore further details of how trajectory predictions are done will not be explained in further detail.

In aspects, the inputs 328 may be continuously received, determined, and updated based on information received by the various sensors and/or controllers of the AV 102a. Thus, the inputs 328 may be updated in real-time, and updated based on the current position of the AV 102a, what objects and environmental factors are currently present in the vicinity of the AV 102a, etc. Real-time refers to a time in seconds, milliseconds, or less that the information may be updated from when it is received by the sensors and/or controllers of the AV 102a. In this way, the most up to date information may be utilized by the system 300 to make a determination regarding how to react to objects in the vicinity of the AV 102a.

In aspects, the inputs 328 may be transmitted to a system intelligence block 334. The system intelligence block 334 refers to a module or set of modules that can implement a learned model 322 and heuristic rules 324 to process the inputs 328. Based on processing the inputs 328, the system intelligence block 334 can determine an error value 326 indicating how reliable the forecasted position is likely to be based on observations of the object.

In aspects, the error value 326 may be determined by having the learned model 322 determine whether a forecasted position is being converged on. This may be done by having the learned model 322 determine whether the object is observed getting closer to the forecasted position or further away from the forecasted position based on the observed data received from the controllers and/or sensors of the AV 102a. In this way, the system intelligence block 334 can also compute a reliability value for a forecasted position based on continued observations of the object rather than waiting for the object to reach its predicted/forecasted position before determining whether the forecasted position was erroneous.

The error value 326 may be the output of the system intelligence block 334. As indicated, the error value 326 can indicate an expected difference between the forecasted trajectory and the actual position of the object. As indicated, the error value 326 may be based on a Euclidean distance between the predicted trajectory (i.e., the forecasted position of the object) and the observed position of the object. How the Euclidian distance is determined will be discussed in further detail below. In aspects, the error value 326 can also be generated based on expected differences in heading, velocity, and acceleration. In aspects, the error value 326 may be expressed/output as a confidence value. For example, the error value 326 may be expressed as a confidence that the forecasted position of the observed object may be trusted within "X" centimeters or meters, where "X" is a real-number. Thus, if the forecasted position is being converged on, the error value 326 can indicate a higher degree of confidence (i.e., a smaller value of "X") than if the forecasted position is being diverged from (i.e., a larger value of "X"). The error value 326 may also be expressed as a confidence that the forecasted heading of the observed object may be trusted within "X" radians or degrees. Similarly, error values for velocity and acceleration can also be determined.

Figure 4:
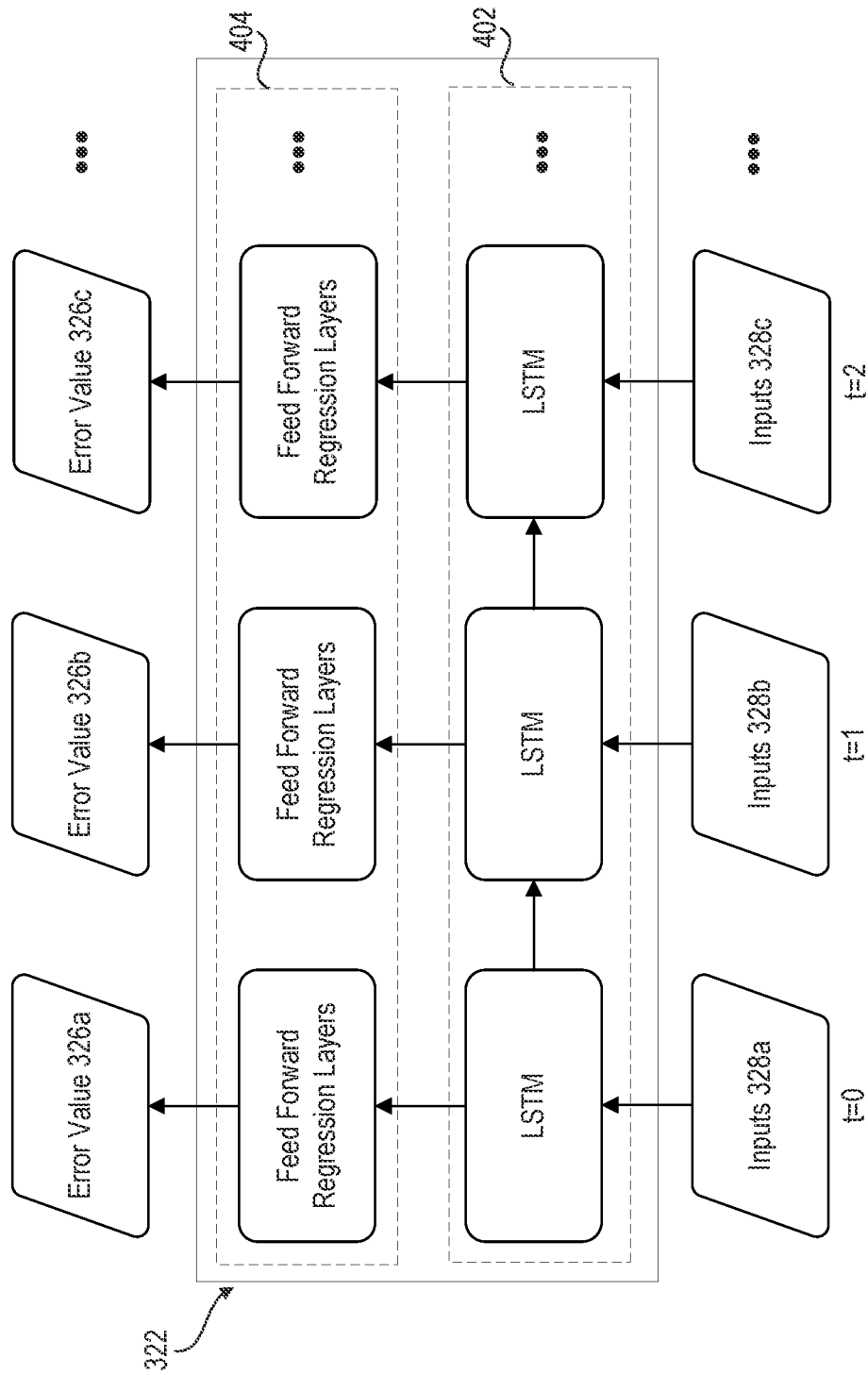
FIG. 4 is an example architecture of a learned model used by the system, in accordance with aspects of the disclosure.

The learned model 322 refers to a machine learning model that may be trained to determine the error value 326 based on the inputs 328. The learned model 322 may be implemented using a variety of machine learning architectures. For example, the learned model 322 may be implemented with linear regression models, logistic regression models, neural networks, LSTM models, etc. In aspects, the learned model 322 may be a combination of any machine learning model architectures. For example, in an aspect, the learned model 322 comprises an LSTM model in combination with a feedforward regression layer of a neural network. Such an architecture is shown in FIG. 4 of this disclosure. In other aspects, the learned model 322 may be implemented as a gradient boosted ensemble regression model with lagged features, or as a linear model with lagged features. How the learned model 322 operates will be described below. For the purposes of discussion with respect to FIG. 3, it is assumed that the learned model 322 can generate error value 326 based on the inputs 328.

In aspects, the learned model 322 can work in conjunction with heuristic rules 324 to smooth out the error value 326. The heuristic rules 324 can smooth out the error value 326 by, for example, implementing rules to determine averages for accumulated error values determined. In this way, the system 300 can base any determinations on whether to react to the object on averages of error values rather than any single error value 326. This avoids the AV 102a making any sudden reactions to objects. Thus, the heuristic rules 324 greatly enhance the AV 102a ride experience because the chances that the AV 102a will react suddenly and/or abruptly to any object will be reduced. In aspects, the heuristic rules 324 can also be utilized to handle special scenarios in which the learned model 322 cannot calculate an error value 326. For example, in instances that the learned model 322 cannot calculate an error value 326, heuristic rules 324 may be put in place to have the AV 102a have a default reaction to objects, for example, slow down to a predetermined speed, move a lateral distance from the object, move a longitudinal distance from the object, etc. Thus, the heuristic rules 324 can compensate for error values that are anomalous (e.g., too high or too low) or implement default rules for how the AV 102a reacts to objects in the cases where the learned model 322 cannot determine error values.

By way of example, the heuristic rules 324 can determine an average value based on the error values generated by accumulating and storing the error values generated over a period of time (e.g., seconds, minutes, etc.). Heuristic rules 324 may be implemented to average the error values over the period of time, to obtain an average error value over that time period. The average error can then be the output of the system intelligence block 334. In aspects, the average error may be transmitted to further modules of the system 300 so that a risk factor may be assigned for the object based on the average error.

In aspects, once the system intelligence block 334 generates the error value 326 and/or an average error value, control may be passed to further modules of the system 300 to assign a risk factor based on the error value 326 and/or the average error value. In aspects, the further modules can include the maneuver determination module 330. The maneuver determination module 330 can enable determining the risk factor. Based on the risk factor the maneuver determination module 330 can generate a control signal 332 indicating whether or not to have the AV 102a perform a maneuver. In aspects, the risk factor may be a value between zero and one (i.e., [0.0, 1.0]). The maneuver determination module 330 can determine and/or assign the risk factor based on the error value 326 or the average error value it receives from the system intelligence block 334. The risk factor can represent a quantification of the level of risk the system 300 believes the object poses to the AV 102a. In aspects, the risk factor may be incremented from 0.0 to 1.0 based on increased risk to the AV 102a. For example, the risk factor may have a value of 0.0 when there is no risk of the AV 102a colliding with an object if the AV 102a continues on its trajectory, and have a value of 1.0 when there is certain risk of collision with the object if the AV 102a continues on its trajectory.

In aspects, the risk factor may be determined and/or assigned based on predetermined rules correlating the error value 326 and/or an average error value to risk factor values in the range from [0.0, 1.0]. The error value 326 can be based on a position and heading error (i.e., based on a forecasted direction of travel of an object). For example, if a vehicle (e.g., AV 102b) is performing a K-Turn, the forecast may be that the actor is performing a turn, but if the vehicle 102b starts reversing thereby changing the direction of travel, the vehicle 102b may be determined to become a very high risk actor with an associated large error value 326.

In aspects, error values may be mapped one-to-one to risk factor values. For example, an error value indicating a confidence that the forecasted position of the observed object may be trusted within 1 centimeter may be mapped to a particular risk factor value from [0.0, 1.0]. In other aspects, error values may be mapped to the risk factor based on ranges, for example, error values in a range from "X" to "Y" correlate to a risk factor value between [0.0, 1.0], while error values in the range from "Y" to "Z" correlate to a different risk factor value between [0.0, 1.0], where "X," "Y," and "Z" are real-numbers. For example, an error of 180 degrees in heading angle of a vehicle 102b may map to risk factor of 1.0. An error of +/−15 degrees in heading may map to 0.0 risky factor. In aspects, the position and heading error both can be combined to assign/calculate a more reliable the risk factor.

In aspects, the correlation between the risk factor and the error values may be predetermined based on previous observations of objects and a determination of what risk they pose to an AV 102a. By way of example, a designer of system 300 can, based on past observations, assign risk factor values for various maneuvers (e.g., another vehicle doing donuts at an intersection, U-turns, K-turns, etc.). These risk factor scores can also be based on factoring in AV 102a movements, speeds, trajectories, distances, etc. of the AV 102a in relation to the maneuvers. Thus, risk factors may be assigned depending on predetermined relationships between the AV 102a and the object performing the maneuver and by taking into account trajectory, speed, etc. of the AV 102a. This observed data may be used to implement rules that may be coded into the maneuver determination module 330, which can use the rules to assign the risk factor when the AV 102a is operating. In aspects, different objects can be assigned different risk factors. For example, a pedestrian 116 and a vehicle (e.g., AV 102b) may be assigned different risk factors because they may pose different risks to the AV 102a when the AV 102a is approaching each at the same rate of speed. In the case of a pedestrian, the pedestrian 116 may pose less risk to the AV 102a than an oncoming vehicle 102b.

In aspects, risk factor scores can be implemented using multi-dimensional lookup tables to assign risk factor interpolated for the speed and margin needed by AV 102a to make a maneuver. For example, if the AV 102a is going very slow (i.e., can easily stop if needed), or the object (e.g., vehicle 102b) is far away (e.g., 2 lanes away from AV 102a), the risk factor maybe set to 0.0 even if the vehicle 102b is performing a high risk maneuver (e.g., a K-Turn), because it will pose a low risk of colliding with AV 102a. An example lookup table is shown below:

| AV 102a | Vehicle rate (meters/second) | | | | | |
|---|---|---|---|---|---|---|
| margin (meters) | 0 | 2 | 4 | 6 | 8 | 10 |
| | | | | Risk factor | | |
| 1.0 | 0.4 | 0.4 | 0.6 | 0.8 | 0.9 | 1.0 |
| 2.0 | 0.2 | 0.4 | 0.65 | 0.75 | 0.75 | 0.75 |
| 3.0 | 0.2 | 0.4 | 0.5 | 0.5 | 0.5 | 0.5 |
| 4.0 | 0.2 | 0.2 | 0.25 | 0.25 | 0.25 | 0.25 |
| 5.0 | 0.2 | 0.2 | 0.0 | 0.0 | 0.0 | 0.0 |

In aspects, based on the assigned risk factor value, the system 300 can determine whether to perform a maneuver for the AV 102a. In aspects, the system 300 may be implemented such that any risk factor value that is non-zero can indicate that an object poses a risk to the AV 102a. If, however, the risk factor value is equal to zero, it may be determined that the object poses no risk to the AV 102a and no maneuver is needed. For any non-zero risk factor value, the maneuver determination module 330 can generate a control signal 332 to induce the control systems of the AV 102a to initiate a maneuver by the AV 102a. The control signal 332 refers to a signal or instructions that can instruct the control systems of the AV 102a to initiate a maneuver. In aspects, the control signal 332 may be transmitted to/or processed by the AV 102a's on-board computing device 220 to have the various controllers of the AV 102a described with respect to FIG. 2, initiate maneuvers for the AV 102a. In aspects, the maneuvers can include moving the AV 102a a longitudinal distance from the object, moving the AV 102a a lateral distance from the object, or slowing down the AV 102a.

In aspects, the maneuvers can have various intensities or degrees based on the risk factor value. For example, if the risk factor value indicates an object poses a high risk to the AV 102a (e.g., a risk factor of "1"), the control signal 332 can instruct the AV 102a to maneuver so that it has a maximum longitudinal distance or lateral distance from the object, or to maneuver the AV 102a to slow down rapidly at a predetermined rate. If, however, the risk factor value indicates an object poses a low risk to the AV 102a (e.g., a risk factor of "0.1"), the control signal 332 can instruct the AV 102 to maneuver a minimal longitudinal distance or lateral distance from the object, or maneuver the AV 102a to slow down at a predetermined rate less rapidly than if there was a higher risk to the AV 102a. Similar multidimensional lookup tables can be used, as discussed with respect to risk factor scores, to implement degrees and intensities based on risk factor value.

In aspects, the longitudinal distances, lateral distances, and the rates at which the AV 102a slows down may be predetermined and correlated to the various risk factor values. In aspects the longitudinal distances, lateral distances, and the rates at which the AV 102a slows down can also be adjusted to account for environmental factors and/or other objects within the vicinity of AV 102a. For example, the distances and speeds may be adjusted depending on the environment the AV 102a is being operated in. By way of example, if the AV 102a is operating on a two-lane road, the maneuver determination module 330 can generate the control signal 332 to initiate a maneuver taking into account the fact that the AV 102a is limited by the number of lanes and distance the AV 102a can move to laterally. Also, for example, if the AV 102a is operating on a road and there is another vehicle beside it, the maneuver determination module 330 can take into account the other vehicle and generate the control signal 332 to initiate a maneuver that will avoid collision with the other vehicle. The aforementioned are examples of how the maneuver may be generated to take into account environmental factors of the AV 102a. Other factors may be taken into account as will be recognized by a POSA given this disclosure.

FIG. 4 is an example architecture of the learned model 322 used by the system 300, in accordance with aspects of the disclosure. The learned model 322 shown in FIG. 4 comprises LSTM models 402 in combination with feedforward regression layers 404 of a RNN that can compute an error value 326 for an observed object at instances in time. Other architectures may be used to implement the learned model 322, including different implementations based on RNNs. As shown in FIG. 4, the inputs to the learned model 322 are inputs 328 at each of the instances in time. The error values for each time instance {t=0, t=1, t=2} are shown as {326a, 326b, 326c}. The inputs for each time instance is shown as {328a, 328b, 328c}. The time instances can go on for any number of instances. Three instances are shown in FIG. 4 for simplicity.

In aspects, the learned model 322 functions by receiving the inputs 328 at each time at each of the LSTM models 402. The LSTM models 402 can generate derived features or values representing the forecasted position of the object based on the inputs 328. The derived features refer to vectors of real numbers for each object at each time cycle. In aspects, the derived features can comprise vectors of 256 real numbers for each object at each time cycle. In aspects, these derived features are then fed into regression layers 404, which can generate the error values {326a, 326b, 326c} at each time instance. Based on the error values determined over the time periods, the average error value may be determined as described with respect to FIG. 3.

In aspects, the learned model 322 shown in FIG. 4 may be trained and optimized to generate error values using a gradient descent algorithm, such as a stochastic gradient descent approach based on errors calculated for observed object behavior. The advantage of using the architecture shown in FIG. 4 is that it has been observed to produce more accurate error value 326 estimations than other learned model architectures, such as those implementing a gradient boosted ensemble regression model with lagged features or a linear model with lagged features. The added benefit of utilizing the architecture of FIG. 4 is that because the LSTM models 402 account for history, lagged features (for example, a last observed error value) do not have to be separately tracked and input as a specific input because the LSTM models 402 will track the last observed error values inherently.

Figure 5:
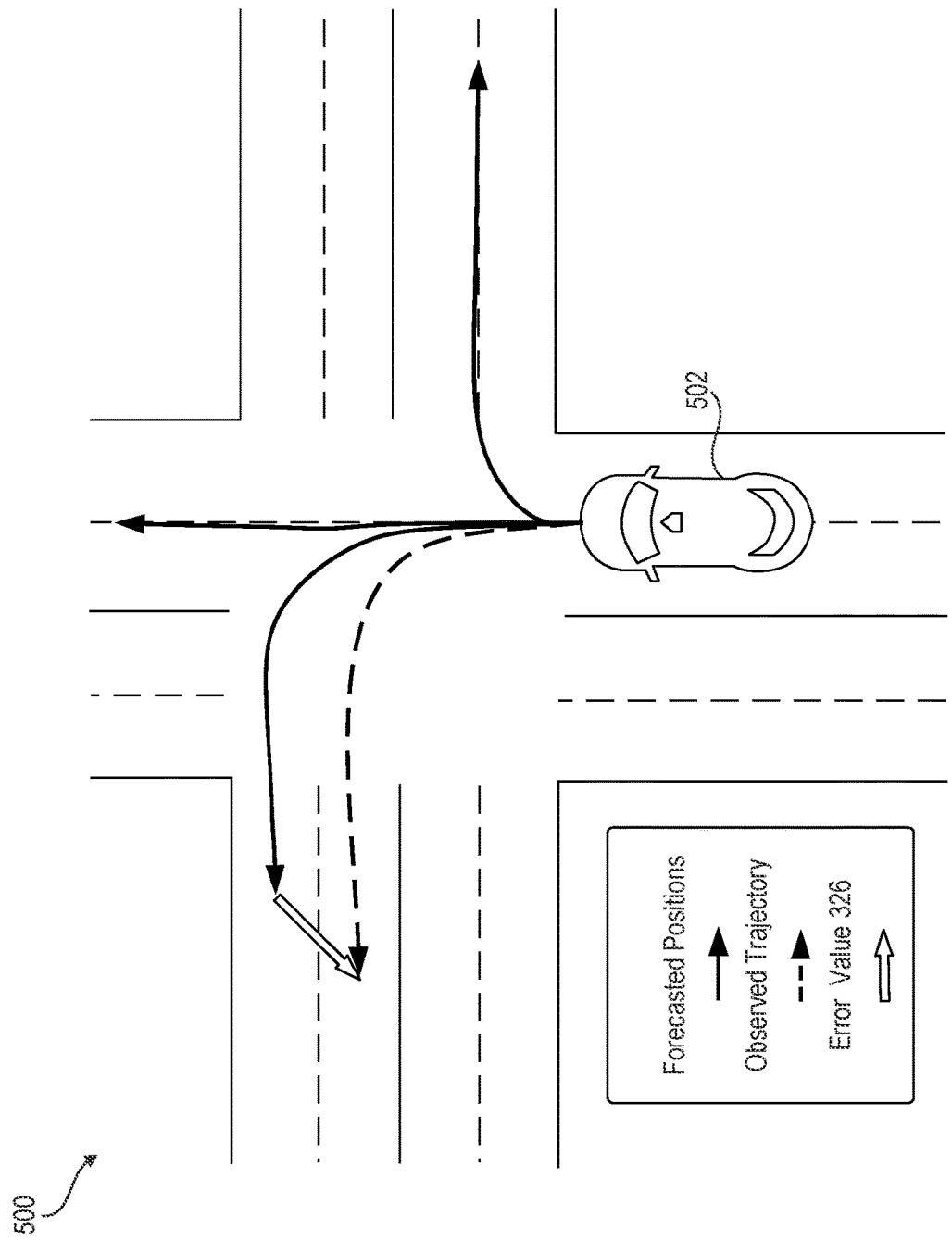
FIG. 5 is an example scenario illustrating how a Euclidean distance is determined for the system, in accordance with aspects of the disclosure.

FIG. 5 is an example scenario 500 illustrating how a Euclidean distance is determined for the system 300, in accordance with aspects of the disclosure. In FIG. 5, an observed object 502 is shown to be a vehicle (e.g., AV 102b). As described with respect to FIG. 3, the error value 326 may be determined based on determining a Euclidean distance between the forecasted position and the observed position of the object 502. The Euclidean distance may be determined by the system intelligence block 334. By way of example and as described with respect to FIG. 3, forecasted positions of object 502 may be determined. The object 502 can then be continuously observed and the Euclidean distance between the observed position of the object 502 and the forecasted positions may be determined. A POSA will know how to compute the Euclidean distance between two positions. The minimum Euclidean distance amongst those calculated may be used to determine the error value 326. In aspects, an angular displacement can also be determined between the observed position and the forecasted positions for the forecasted position with the minimum Euclidean distance. A POSA will also know how to compute the angular displacement. Both components of displacement can then comprise the error value 326.

The modules implementing functions described with respect to FIGS. 3-5, may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 300 or installed as a removable portion of the system 300.

The system 300 described above improves the state of the art from conventional systems because it provides a novel way to have AV 102a deal with objects that may pose a risk to the AV 102a. The system 300 is unique from conventional system in that, rather than forecast positions of objects that may pose a risk to the AV 102a and wait to see if its predictions are validated, the system 300 forecasts positions of objects and computes error values indicating whether the forecasted positions are likely to be reliable. This may be done in real-time. This identification of errors in prediction forecasts in an on-the-fly manner enables motion planning to treat error-prone forecasts with more caution and enables an AV 102a to use this information to adjust and improve predicted trajectories to avoid and/or react to objects. The error values can indicate to the AV 102a at what level of confidence its prediction forecasts for the object are reliable and based on the same they can allow the AV 102a to react to the object.

In addition to the aforementioned improvements, the system 300 has two additional benefits. First, it allows the AV 102a to avoid getting close to objects it does not fully understand but may pose a risk to it or vice versa. Thus, it improves the functioning of AVs. Second, it enhances the ride experience for passengers of the AV 102a because by recognizing potentially dangerous situations and reacting to them in ample time, the system 300 allows the AV 102a to avoid last second maneuvers such as sudden braking, jerking, turning, etc. when the AV 102a encounters potentially risky situations and that will create an unpleasant ride experience for passengers.

Figure 6:
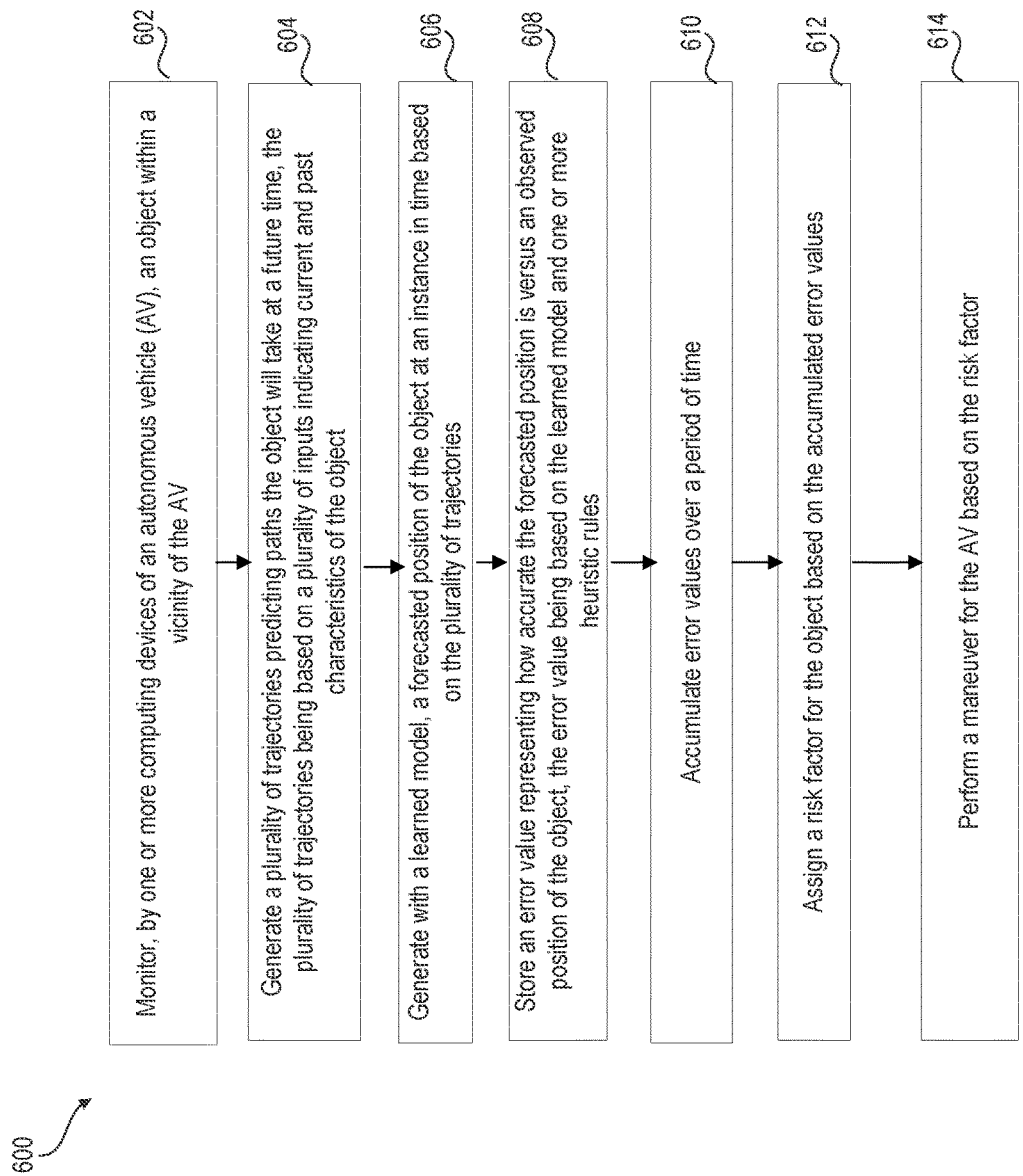
FIG. 6 is an example method of operating the system, in accordance with aspects of the disclosure.

FIG. 6 is an example method 600 of operating the system 300, in accordance with aspects of the disclosure. Method 600 may be performed by the modules of system 300. In aspects, the on-board computing device 220 can execute instructions stored on a non-transitory computer readable medium to perform method 600. Method 600 can comprise a series of steps. As shown in 602, method 600 may begin by monitoring an object (e.g., vehicle 102b) within a vicinity of the AV 102a. As shown in 604, a plurality of trajectories predicting paths the object will take at a future time can be generated, the plurality of trajectories being based on a plurality of inputs 328 indicating current and past characteristics of the object. At 606, using a learned model 322, a forecasted position of the object at an instance in time can be generated based on the plurality of trajectories. At 608, an error value 326 representing how accurate the forecasted position is versus an observed position of the object can be stored, the error value 326 being based on the learned model 322 and one or more heuristic rules 324. At 610, error values can be accumulated over a period of time. At 612, a risk factor can be assigned for the object based on the accumulated error values. At 614, a maneuver for the AV can be performed based on the risk factor. The operations of method 600 may be performed, in accordance with aspects described above.

Figure 7:
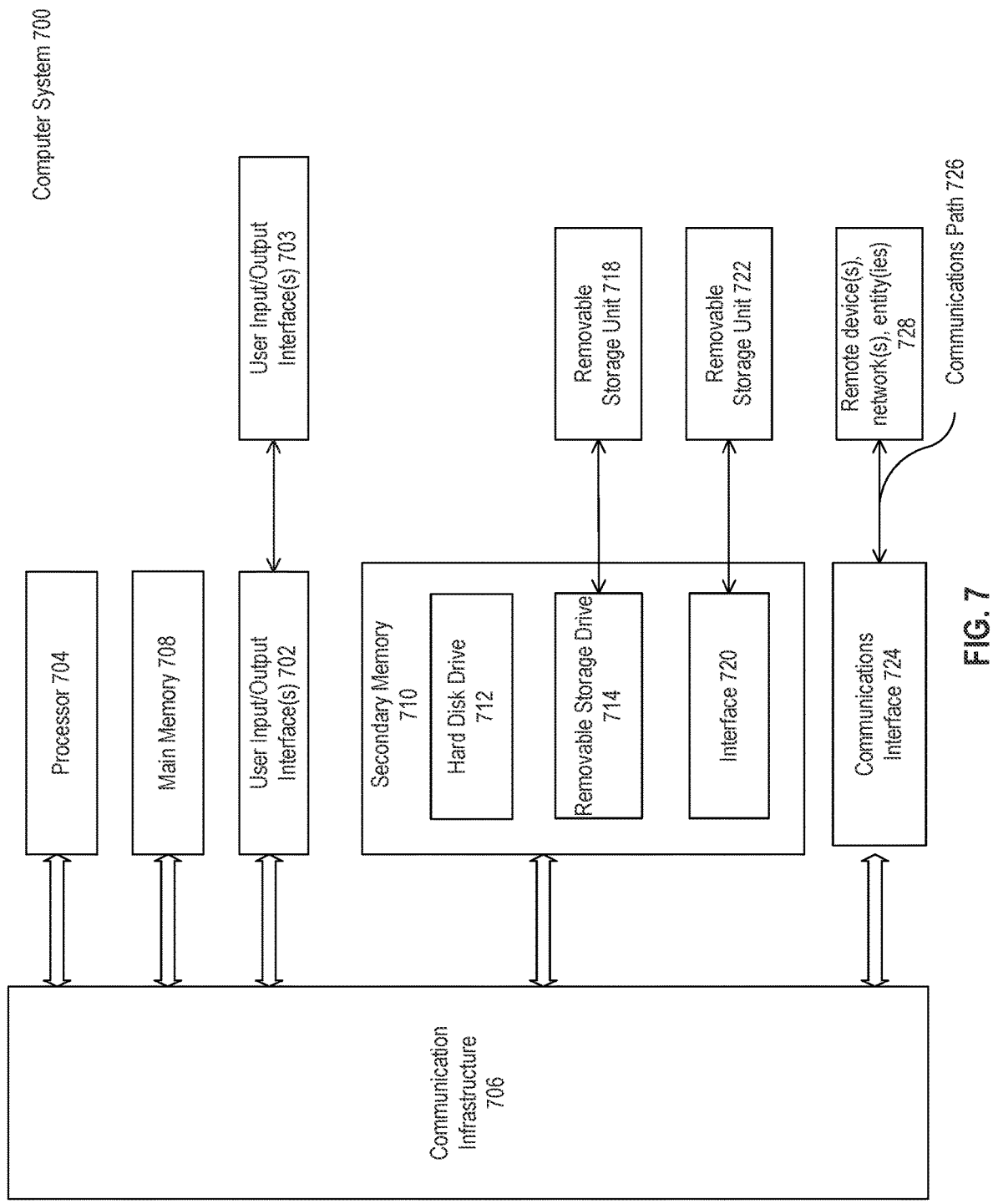
FIG. 7 is an example computer system useful for implementing various aspects, in accordance with aspects of the disclosure.

FIG. 7 is an example computer system 700 useful for implementing system 300, in accordance with aspects of the disclosure. Computer system 700 may be any computer capable of performing the functions described herein. The on-board computing device 220 of FIG. 2 may be implemented using components of the computing system 700.

Computer system 700 includes one or more processors (also called central processing units, or CPUs), such as a processor 704. Processor 704 is connected to a communication infrastructure or bus 706.

One or more processors 704 may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary aspect, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer implemented method comprising:
monitoring, by one or more computing devices of an autonomous vehicle (AV), an object within a vicinity of the AV;
generating, by the one or more computing devices, a plurality of trajectories predicting paths the object will take at a future time, the plurality of trajectories being based on a plurality of inputs indicating current and past characteristics of the object;
generating, by the one or more computing devices and with a learned model, a forecasted position of the object at an instance in time based on the plurality of trajectories;
storing, by the one or more computing devices, an error value representing how accurate the forecasted position is versus an observed position of the object, the error value being based on the learned model and one or more heuristic rules;
accumulating, by the one or more computing devices, a plurality of the error values over a period of time;
assigning, by the one or more computing devices, a risk factor for the object based on an average of the plurality of the error values and a predefined correlation associating multiple values of an average error value to a respective value for the risk factor; and
performing, by the one or more computing devices, a maneuver for the AV based on the risk factor.

2. The method of claim 1, wherein the maneuver comprises: moving the AV a longitudinal distance from the object, moving the AV a lateral distance from the object, or slowing down the AV.

3. The method of claim 1, wherein the error value is based on a Euclidean distance between the forecasted position and the observed position of the object.

4. The method of claim 1, wherein the learned model comprises a Recurrent Neural Network (RNN) model with a feedforward regression layer.

5. The method of claim 1, wherein the risk factor is a value between 0.0 and 1.0.

6. The method of claim 5, further comprising performing the maneuver for the AV when the risk factor is determined to be greater than 0.0.

7. A non-transitory computer readable medium including instructions for causing one or more processors to perform operations comprising:
monitoring, by one or more computing devices of an autonomous vehicle (AV), an object within a vicinity of the AV;
generating, by the one or more computing devices, a plurality of trajectories predicting paths the object will take at a future time, the plurality of trajectories being based on a plurality of inputs indicating current and past characteristics of the object;
generating, by the one or more computing devices and with a learned model, a forecasted position of the object at an instance in time based on the plurality of trajectories;
storing, by the one or more computing devices, an error value representing how accurate the forecasted position is versus an observed position of the object, the error value being based on the learned model and one or more heuristic rules;
accumulating, by the one or more computing devices, a plurality of the error values over a period of time;
assigning, by the one or more computing devices, a risk factor for the object based on an average of the plurality of the error values and a predefined correlation associating multiple values of an average error value to a respective value for the risk factor; and
performing, by the one or more computing devices, a maneuver for the AV based on the risk factor.

8. The non-transitory computer readable medium of claim 7, wherein the maneuver comprises: moving the AV a longitudinal distance from the object, moving the AV a lateral distance from the object, or slowing down the AV.

9. The non-transitory computer readable medium of claim 7, wherein the error value is based on a Euclidean distance between the forecasted position and the observed position of the object.

10. The non-transitory computer readable medium of claim 7, wherein the learned model comprises a Recurrent Neural Network (RNN) model with a feedforward regression layer.

11. The non-transitory computer readable medium of claim 7, wherein the risk factor is a value between 0.0 and 1.0.

12. The non-transitory computer readable medium of claim 11, wherein the operations further comprise performing the maneuver for the AV when the risk factor is determined to be greater than 0.0.

13. A computing system comprising:
a memory of an autonomous vehicle (AV) configured to store instructions;
a processor of the AV, coupled to the memory, configured to process the stored instructions to:
monitor an object within a vicinity of the AV;
generate a plurality of trajectories predicting paths the object will take at a future time, the plurality of trajectories being based on a plurality of inputs indicating current and past characteristics of the object;
generate with a learned model, a forecasted position of the object at an instance in time based on the plurality of trajectories;
store an error value representing how accurate the forecasted position is versus an observed position of the object, the error value being based on the learned model and one or more heuristic rules;
accumulate a plurality of the error values over a period of time;
assign a risk factor for the object based on an average of the plurality of the error values and a predefined correlation associating multiple values of an average error value to a respective value for the risk factor; and
perform a maneuver for the AV based on the risk factor.

14. The computing system of claim 13, wherein the maneuver comprises: moving the AV a longitudinal distance from the object, moving the AV a lateral distance from the object, or slowing down the AV.

15. The computing system of claim 13, wherein the error value is based on a Euclidean distance between the forecasted position and the observed position of the object.

16. The computing system of claim 13, wherein the learned model comprises a Recurrent Neural Network (RNN) model with a feedforward regression layer.

17. The computing system of claim 13, wherein:
the risk factor is a value between 0.0 and 1.0; and
wherein the processor is further configured to perform the maneuver for the AV when the risk factor is determined to be greater than 0.0.

* * * * *